United States Patent
Comito et al.

(10) Patent No.: US 10,735,825 B1
(45) Date of Patent: Aug. 4, 2020

(54) COORDINATION OF MEDIA CONTENT DELIVERY TO MULTIPLE MEDIA PLAYERS

(71) Applicant: Disney Enterprises, Inc., Burbank, CA (US)

(72) Inventors: Keith Comito, Seaford, NY (US); Nathan Lefler, New York, NY (US); James A. Corrigan-Colville, Northport, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/270,467

(22) Filed: Feb. 7, 2019

(51) Int. Cl.
| | |
|---|---|
| H04N 21/6543 | (2011.01) |
| H04N 21/242 | (2011.01) |
| H04N 21/239 | (2011.01) |
| H04N 21/2387 | (2011.01) |
| H04N 21/8547 | (2011.01) |
| H04N 21/63 | (2011.01) |
| H04N 21/43 | (2011.01) |
| H04N 21/437 | (2011.01) |
| H04N 21/45 | (2011.01) |
| H04N 21/647 | (2011.01) |

(52) U.S. Cl.
CPC ....... *H04N 21/6543* (2013.01); *H04N 21/239* (2013.01); *H04N 21/2387* (2013.01); *H04N 21/242* (2013.01); *H04N 21/4307* (2013.01); *H04N 21/437* (2013.01); *H04N 21/4532* (2013.01); *H04N 21/632* (2013.01); *H04N 21/64738* (2013.01); *H04N 21/8547* (2013.01)

(58) Field of Classification Search
CPC ... H04L 65/4092; H04L 67/16; H04L 67/322; H04N 21/242; H04N 21/4788
See application file for complete search history.

(56) References Cited

U.S. PATENT DOCUMENTS

| | | |
|---|---|---|
| 7,092,774 B1 | 8/2006 | Gifford |
| 9,813,667 B1 | 11/2017 | Patel |
| 9,820,002 B2 | 11/2017 | Barsook |

(Continued)

OTHER PUBLICATIONS

"Watch2Gether." *Watch2Gether*, www.watch2gether.com/.

(Continued)

*Primary Examiner* — Omar S Parra
(74) *Attorney, Agent, or Firm* — Farjami & Farjami LLP

(57) ABSTRACT

A system for synchronizing media content playout includes a computing platform having a hardware processor and a system memory storing a software code. The hardware processor executes the software code to receive a first state message from a first media player playing a first media content and a second state message from a second media player playing a second media content, the first media content and the second media content being the same media content. The software code further determines a coordination state for playout of the first media content and the second media content based on one or more of the first and second state messages, and transmits a first coordination message including the coordination state to the first media player and a second coordination message including the coordination state to the second media player to synchronize playout of the first media content and the second media content.

30 Claims, 10 Drawing Sheets

(56) References Cited

U.S. PATENT DOCUMENTS

| | | |
|---|---|---|
| 10,536,741 B1* | 1/2020 | Madison .............. H04N 21/433 |
| 2004/0098754 A1 | 5/2004 | Vella |
| 2013/0067116 A1* | 3/2013 | Ostergren ........... H04L 65/4069 |
| | | 709/248 |

OTHER PUBLICATIONS

"A New Way to Watch Netflix Together." *Netflix Party*, www.netflixparty.com/.
"Rabbit—The Way to Watch Anything with Anyone." *Rabbit—The Way to Watch Anything with Anyone*, www.rabb.it/.

* cited by examiner

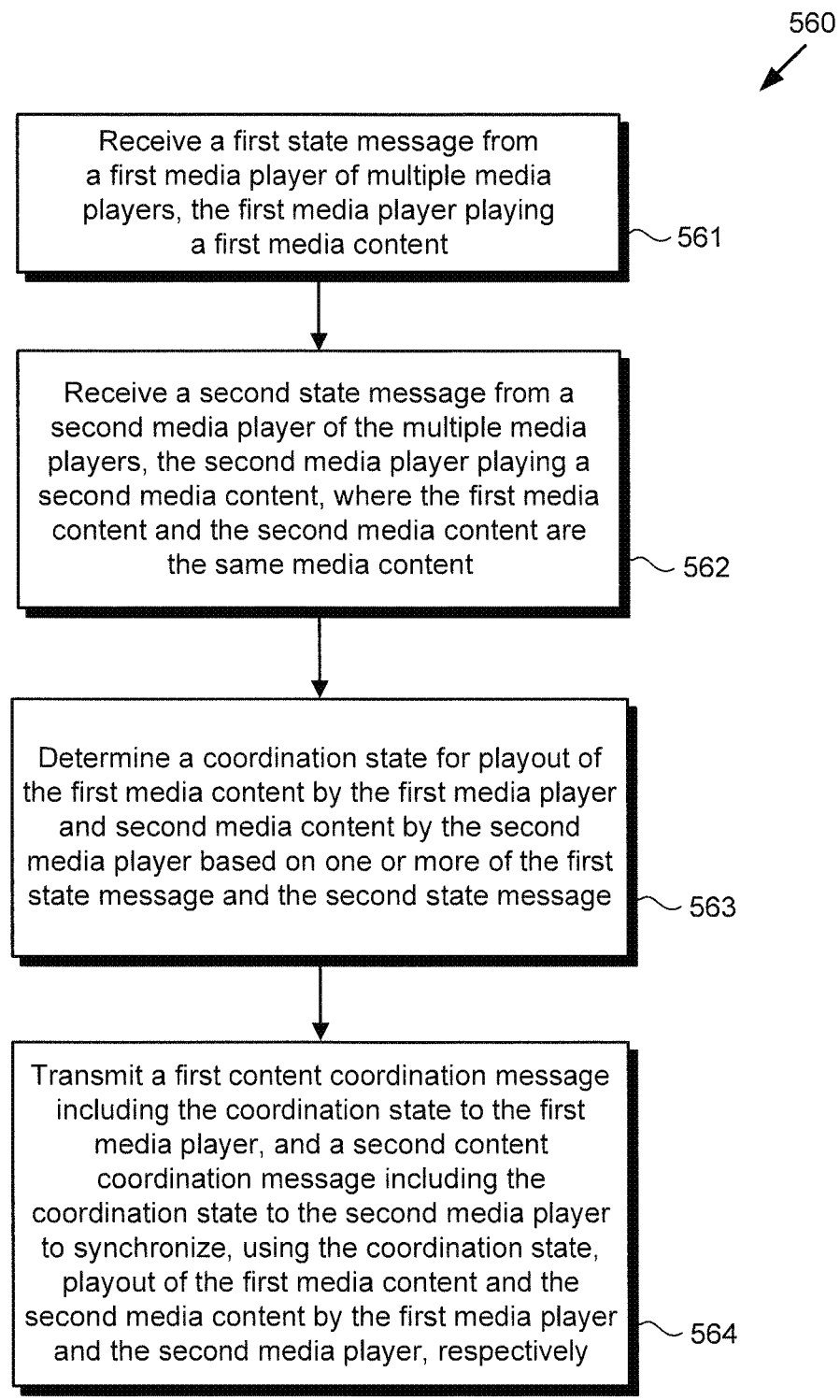

*Example State Messages:*

600 

User Opens Connection:
*Meta Data:* User ID, user authentication info
User Closes Connection:
*Meta Data:* User ID, user authentication info
User Requests Latency Check:
*Meta Data:* Timestamp, Unique ID for this check
*Example Session Related State Messages:*
User Creating a Session:
*Meta Data:* Media Content ID, playhead position, play/pause state, session settings such as who can affect shared session state (i.e. just the host or everyone), permissions on who can enter the session on invitation or request, etc.
User Requesting to Join a Session:
*Meta Data:* Session ID, Media Content ID
User Joining a Session:
*Meta Data:* Session ID, Media Content ID
User Leaving a Session:
*Meta Data:* Session ID, Media Content ID
User Invites Friend(s) to a Session
*Meta Data:* Session ID, Friend IDs
User Requests to Kick Friend(s) from a Session
*Meta Data:* Session ID, Friend IDs
User Triggers Media Play:
*Meta Data:* Session ID, connection integrity information
User Triggers Media Pause:
*Meta Data:* Session ID, connection integrity information
User Triggers Media Playhead Position Change:
*Meta Data:* Session ID, connection integrity information
User Connection Integrity Status Change:
*Meta Data:* Session ID, connection integrity information
User Requests List of Active Sessions with Friends in Them:
*Meta Data:*
User Requests List of Their Friends:
*Meta Data:*
Users Friend List Results:
*Meta Data:* Friends IDs and meta data
User Requests Adding Friend(s):
*Meta Data:* Friend IDs
User Friend(s) Added:
*Meta Data:* Friend IDs
User Requests Removing Friend(s):
*Meta Data:* Friend IDs
User Friend(s) Removed:
*Meta Data:* Friend IDs

Fig. 6

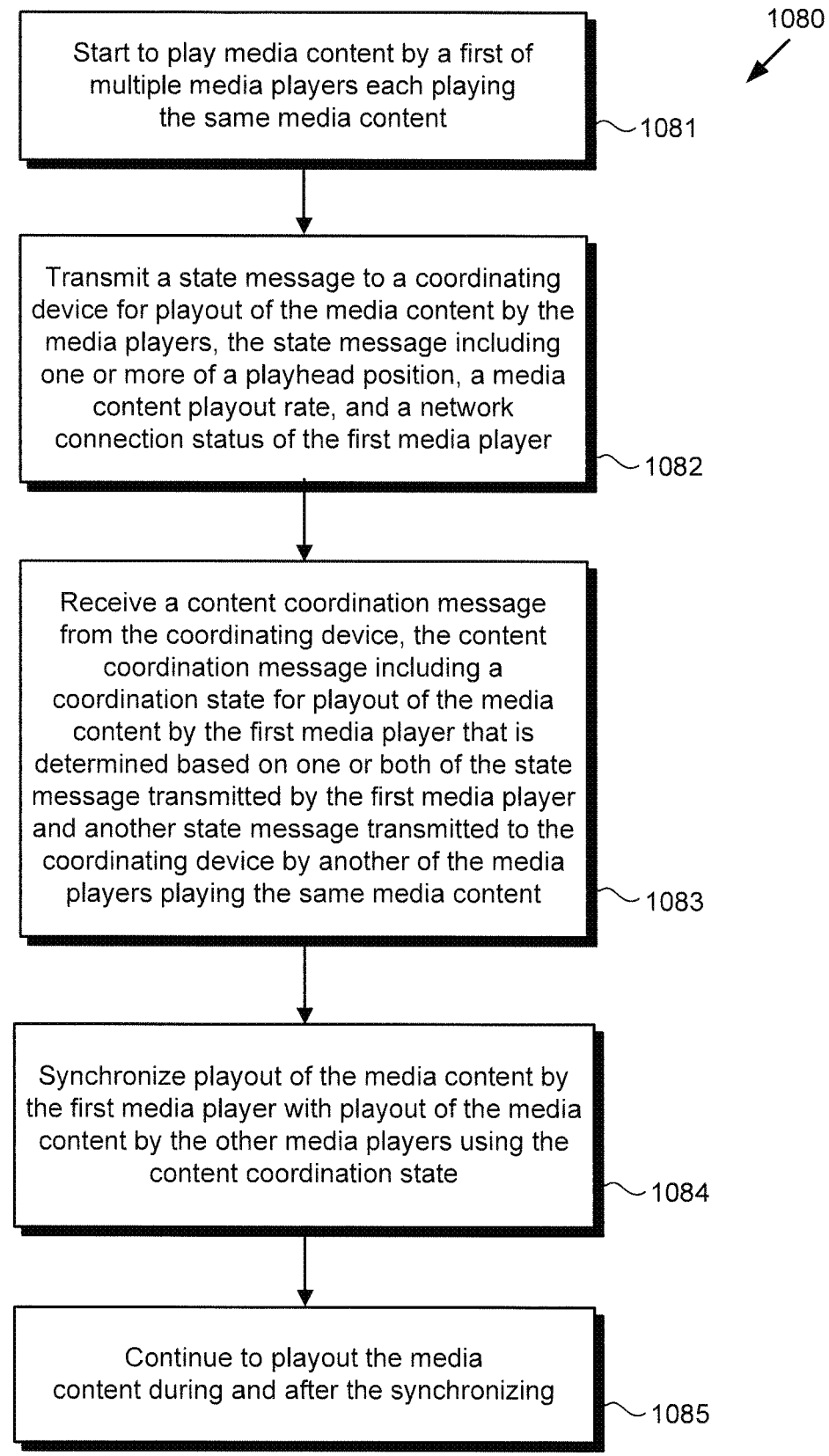

COORDINATION OF MEDIA CONTENT DELIVERY TO MULTIPLE MEDIA PLAYERS

BACKGROUND

The demands of work and schooling, as well as romantic attachments, all tend to disperse childhood friends and nuclear families as young people mature into adulthood. As a result, and further due at least in part to the cost and inconvenience of long distance travel, it may be desirable to share group entertainment experiences with family and friends without leaving home. For example, a married couple with young children may wish to watch a holiday movie from home while sharing that viewing experience with the children's grandparents living in another state, or a group of college friends may want to collectively watch a sporting event involving their alma mater.

Conventional solutions for enabling remote group participation in a shared media consumption experience suffer from shortcomings including poor audio/video quality and poor synchronization. These prior solutions tend to fall into one of several categories. One conventional category of solutions requires that remote viewers manually coordinate their inputs to their media players by, for example, pushing "play" at the same time. However, those solutions typically suffer from lack of playout synchronization due to human error, or desynchronization over time due to frame rate and buffering issues.

Another conventional category of solutions relies on third party services that capture and rebroadcast media content to the members of the remote group. However, those conventional solutions typically provide relatively poor audio and video quality due to the content being rebroadcast from the host's system instead of being fetched independently by each viewer device. Moreover, because one member of the remote group must typically act as a host controlling the broadcast, the resulting group experience is not truly interactive.

Issues of synchronization of digital entertainment also arise in multiplayer online gaming. In these environments, remote gaming devices render the gaming environment locally and communicate user inputs (e.g., regarding character movements and actions) with a central server, while receiving inputs on the movements of other users' characters and actions from the central server. Latency issues are dealt with by the remote devices locally making predictions of character movements and actions, which are then overridden by server instructions only when necessary. These solutions to latency reduction and synchronization are not applicable to audio/video broadcast, streaming, and playback environments.

BRIEF DESCRIPTION OF THE DRAWINGS

FIG. 5 shows a flowchart presenting an exemplary method for use by a system for synchronizing media content playout, according to one implementation;

FIG. 6 shows a list of example state messages including user state data for use by a system for coordinating delivery of media content to multiple media players, according to one implementation;

FIG. 10 shows a flowchart presenting an exemplary method for use by a first media player for synchronizing playout of media content with playout of another instantiation of the same media content by a second media player, according to one implementation.

DETAILED DESCRIPTION

Figure 1:
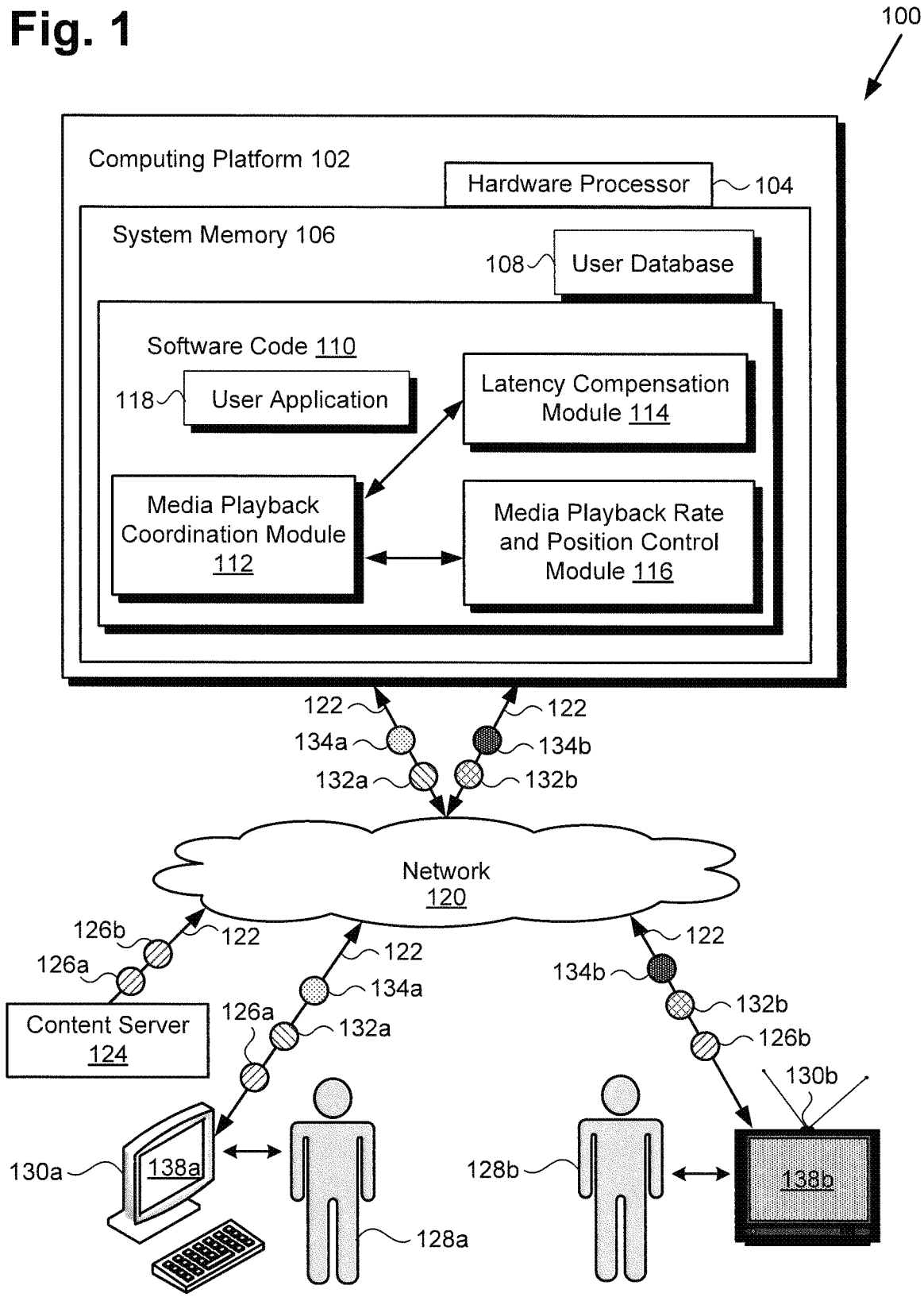
FIG. 1 shows a diagram of an exemplary system for coordinating delivery of media content to multiple media players, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations.

Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for coordinating media content delivery that overcome the drawbacks and deficiencies in the conventional art. The systems and methods disclosed herein provide a robust solution for multiple users to concurrently enjoy synchronized content that is applicable to live content as well as recorded media content. According to various implementations of the present inventive principles, each user utilizes a media player having a bidirectional and persistent connection to a content coordination service. Each user may individually stream or otherwise access a different instantiation of the same content rather than sharing a single streaming session that is mirrored to each user.

For example, in some implementations, a user may have an instantiation of the same content stored locally in media player memory or other local memory (e.g., DVR, DVD, etc.). In those implementations, the user may access the same media content directly from memory. In other implementations, one user may be viewing content via a scheduled broadcast such as a cable, satellite, or over-the-air broadcast, while other users may be viewing the same content via an Internet streaming connection or accessing from local memory. In still other implementations, all users may be accessing live broadcasts or Internet streams of the same content (e.g., a live-broadcast sporting event).

Moreover, each user may have the capability of influencing the factors that determine content synchronization, rather than one user being required to act as a controlling host. Nevertheless, in implementations in which it may be advantageous or desirable for one or more users to exercise greater control over a particular shared media content consumption session, that user or those users may act as a host or hosts in control of media content presentation during that session.

It is noted that, as defined for the purposes of the present application, the expressions "media content" and "same media content" refer interchangeably to content including substantially the same primary content having the same timecode sequence or timeline, but may include variations in supplemental or ancillary content. For example, as used herein, the same media content in the form of movie or television (TV) programming content may include the same sequence of video frames, but may be accompanied by dialogue presented in different languages, or may be accompanied by different audio tracks depending on user preference.

As another example, the same media content in the form of sports content may refer to the same sporting event shown from video captured by different cameras, or different perspectives, or even distributed by different broadcast networks. As yet another example, the same media content of a synchronized dance party may include different camera angles where shots of different dancers are shown for the same music.

In another example, two users may be viewing primary content where one user's primary content is supplemented by secondary content while the other user's is not. This might arise, for example, if the second user has a commercial-free subscription to a video streaming service, while the other user does not. In this case, the commercials in the first user's stream would constitute secondary content, but the reader will understand that the two users are viewing the "same content" for the purposes of this disclosure.

Furthermore, in some implementations, "media content" and "same media content" may include images of individual users reacting to a shared content consumption experience. For instance, a camera local to an individual user of an Internet based chat room may capture and transmit that user's facial expressions, movements, or statements in response to chat room interactions with other users of the chat room. Alternatively, a camera local to an individual member of a group viewing the same entertainment content may capture and transmit that group member's reactions to viewing the entertainment content.

It is further noted that, as defined in the present application, the term "instantiation" refers to a distinct unit of media content, as defined above. That is to say, different instantiations of the same media content refers to different data streams of the same media content, different digital media files including different copies or versions of the same media content, or different units of physical media having stored thereon different copies or versions of the same media content.

FIG. 1 shows a diagram of exemplary system 100 for coordinating delivery of media content to multiple media players, according to one implementation. As shown in FIG. 1, system 100 includes computing platform 102 having hardware processor 104 and system memory 106 implemented as a non-transitory storage device storing user database 108 and software code 110. According to the present exemplary implementation, software code 110 includes media playout coordination module 112, latency compensation module 114, media playout rate and position control module 116, and user application 118.

As further shown in FIG. 1, system 100 is implemented within a use environment including communication network 120, content server 124, and media players 130a and 130b having respective displays 138a and 138b, and utilized by respective users 128a and 128b. In addition, FIG. 1 shows network communication links 122 interactively connecting computing platform 102 and content server 124 with media players 130a and 130b. Also shown in FIG. 1 are first media content 126a and second media content 126b, state message 132a provided by media player 130a, state message 132b provided by media player 130b, and content coordination messages 134a and 134b output to respective media players 130a and 130b by software code 110. It is noted that first media content 126a and second media content 126b are different instantiations 126a and 126b of the same media content.

It is further noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts user database 108 and software code 110 including media playout coordination module 112, latency compensation module 114, media playout rate and position control module 116, and user application 118 as being stored together in system memory 106, that representation is also provided merely as an aid to conceptual clarity. More generally, system 100 may include one or more computing platforms 102, such as computer servers, for example, which may be co-located, or may form an interactively linked but distributed system, such as a cloud based system, for instance.

As a result, hardware processor 104 and system memory 106 may correspond to distributed processor and memory resources within system 100. Thus, it is to be understood that database 108 and media playout coordination module 112, latency compensation module 114, media playout rate and position control module 116, and user application 118 of software code 110 may be stored remotely from one another and may be executed using the distributed processor resources of system 100.

According to some implementations, users 128a and 128b can utilize respective media players 130a and 130b to participate in a shared and substantially synchronized media consumption experience of first media content 126a and second media content 126b. In some implementations, first media content 126a and second media content 126b may be different data streams of the media content provided by content server 124. In other implementations, first media content 126a and second media content 126b may be different copies of a digital media file provided by content server 124. In yet other implementations, first media content 126*a* and second media content 126*b* may be stored locally on respective media players 130*a* and 130*b*. In those latter implementations, one or more of first media content 126*a* and second media content 126*b* may be stored on a computer-readable non-transitory medium of one or both of media players 130*a* and 130*b*.

System 100 including computing platform 102 provides the media content coordination service enabling users 128*a* and 128*b* to participate interactively in the shared media consumption experience of first media content 126*a* and second media content 126*b* using respective media players 130*a* and 130*b*. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of private or limited distribution network.

It is noted that although media player 130*a* is shown as a desktop computer, while media player 130*b* is shown as a smart television (smart TV) in FIG. 1, those representations are merely exemplary. More generally, media players 130*a* and 130*b* may be implemented using any suitable mobile or stationary computing device or system remote from computing platform 102 and capable of performing data processing sufficient to provide a user interface, support connections to communication network 120, and implement the functionality ascribed to media players 130*a* and 130*b* herein. For example, in other implementations, one or both of media players 130*a* and 130*b* may take the form of a laptop computer, tablet computer, smartphone, or gaming console, for example.

It is further noted that displays 138*a* and 138*b* of respective media players 130*a* and 130*b* may be implemented as liquid crystal displays (LCDs), light-emitting diode (LED) displays, organic light-emitting diode (OLED) displays, or another suitable display screens that perform a physical transformation of signals to light. It is also noted that, in some implementations, one or more of displays 138*a* and 138*b* may be implemented as an augmented reality (AR), virtual reality (VR), or holographic display, or may take the form of an audio, braille, or other output device providing accessibility to a disabled user.

In some implementations, system 100 may include computing platform 102, but may not include any of the media players for which it provides content playout coordination services. That is to say, in some implementations, system 100 may include computing platform 102 but not media players 130*a* and 130*b*. However, in other implementations, system 100 may include media players 130*a* and 130*b* in addition to computing platform 102.

Moreover, although software code 110 is shown to include latency compensation module 114 and media playout rate and position control module 116, in addition to media playout coordination module 112 and user application 118, that representation is merely exemplary. In some other implementations, software code 110 may optionally omit latency compensation module 114 and media playout rate and position control module 116. In those implementations, versions of latency compensation module 114 and media playout rate and position control module 116 may reside on media players 130*a* and 130*b*.

Figure 2:
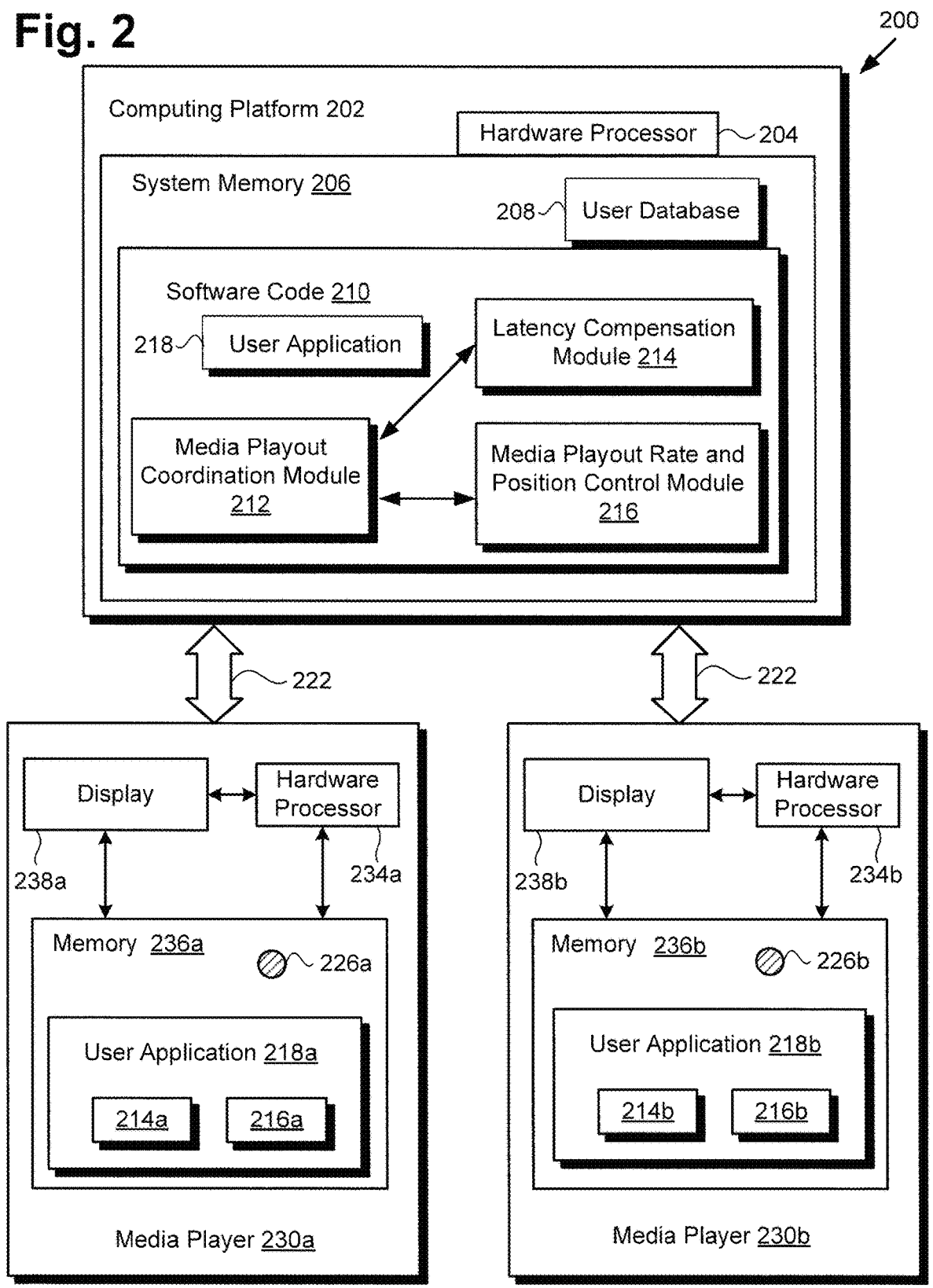
FIG. 2 shows a more detailed representation of the exemplary system for coordinating delivery of media content to multiple media players of FIG. 1, according to one implementation.

FIG. 2 shows a more detailed representation of the exemplary system for coordinating delivery of media content to multiple media players of FIG. 1, according to one implementation. As shown in FIG. 2, system 200 includes computing platform 202 interactively connected to media players 230*a* and 230*b* over network communication links 222. As further shown in FIG. 2, computing platform 202 includes hardware processor 204, and system memory 206 implemented as a non-transitory storage device storing user database 208 and software code 210. According to the exemplary implementation shown in FIG. 2, software code 210 includes media playout coordination module 212, latency compensation module 214, media playout rate and position control module 216, and user application 218.

As also shown in FIG. 2, media player 230*a* includes display 238*a*, hardware processor 234*a*, and memory 236*a* storing user application 218*a*, while media player 230*b* includes display 238*b*, hardware processor 234*b*, and memory 236*b* storing user application 218*b*. It is noted that memory 236*a* and memory 236*b* of respective media players 230*a* and 230*b* are non-transitory storage devices. According to the present exemplary implementation, user application 218*a* includes latency compensation module 214*a* and media playout rate and position control module 216*a*, while user application 218*b* includes latency compensation module 214*b* and media playout rate and position control module 216*b*. Also shown in FIG. 2 are first media content 226*a* and second media content 226*b*.

Network communication links 222, first media content 226*a* and second media content 226*b*, and computing platform 202 including hardware processor 204 and system memory 206 correspond in general to network communication links 122, first media content 126*a* and second media content 126*b*, and computing platform 102 including hardware processor 104 and system memory 106, in FIG. 1. In addition, user database 208 and software code 210 including media playout coordination module 212, latency compensation module 214, media playout rate and position control module 216, and user application 218, in FIG. 2, correspond in general to user database 108 and software code 110 including media playout coordination module 112, latency compensation module 114, media playout rate and position control module 116, and user application 118, in FIG. 1. In other words, software code 210 may share any of the characteristics attributed to corresponding software code 110 by the present disclosure, and vice versa.

Media players 230*a* and 230*b* having respective displays 238*a* and 238*b* correspond respectively in general to media players 130*a* and 130*b* having respective displays 138*a* and 138*b*, in FIG. 1. In other words, media players 230*a* and 230*b*, and displays 238*a* and 238*b* may share any of the characteristics attributed to corresponding media players 130*a* and 130*b*, and displays 138*a* and 138*b* by the present disclosure, and vice versa. Thus, although not shown in FIG. 1, media player 130*a* may include features corresponding to hardware processor 234*a* and memory 236*a* storing user application 218*a* and first media content 226*a*, while media player 130*b* may include features corresponding to hardware processor 234*b* and memory 236*b* storing user application 218*b* and second media content 226*b*.

It is noted that, in some implementations, user applications 218*a* and 218*b* may include one or both of respective latency compensation module 214*a* and 216*b*, and media playout rate and position control module 216*a* and 216*b*. However, in other implementations, user applications 218*a* and 218*b* may optionally omit one or both of latency compensation module 214*a* and 216*b*, and media playout rate and position control module 216*a* and 216*b*.

According to the exemplary implementation shown in FIG. 2, user application 218*a* is located in memory 236*a* of media player 130*a*/230*a* and user application 218*b* is located in memory 236*b* of media player 130*b*/230*b*, user applications 218*a* and 218*b* having been received from computing platform 102/202 via communication network 120 and network communication links 122/222. In one implementation, network communication links 122/222 correspond to transfer of user applications 118*a*/218*a* and 118*b*/218*b* over a packet-switched network, for example. Once transferred, for instance by being downloaded over network communication links 122/222, user applications 118*a*/218*a* and 118*b*/218*b* may be persistently stored in respective memories 236*a* and 236*b*, and may be executed locally on respective media players 130*a*/230*a* and 130*b*/230*b* by respective hardware processors 234*a* and 234*b*.

Hardware processors 234*a* and 234*b* may be the central processing units (CPUs) for respective media players 130*a*/230*a* and 130*b*/230*b*, for example, in which role hardware processors 234*a* and 234*b* run the respective operating systems for media players 130*a*/230*a* and 130*b*/230*b*, and execute respective user applications 218*a* and 218*b*. As noted above, displays 238*a* and 238*b* may take the form of liquid LCDs, LED displays, OLED displays, or any suitable display screens that perform a physical transformation of signals to light.

Figure 3:
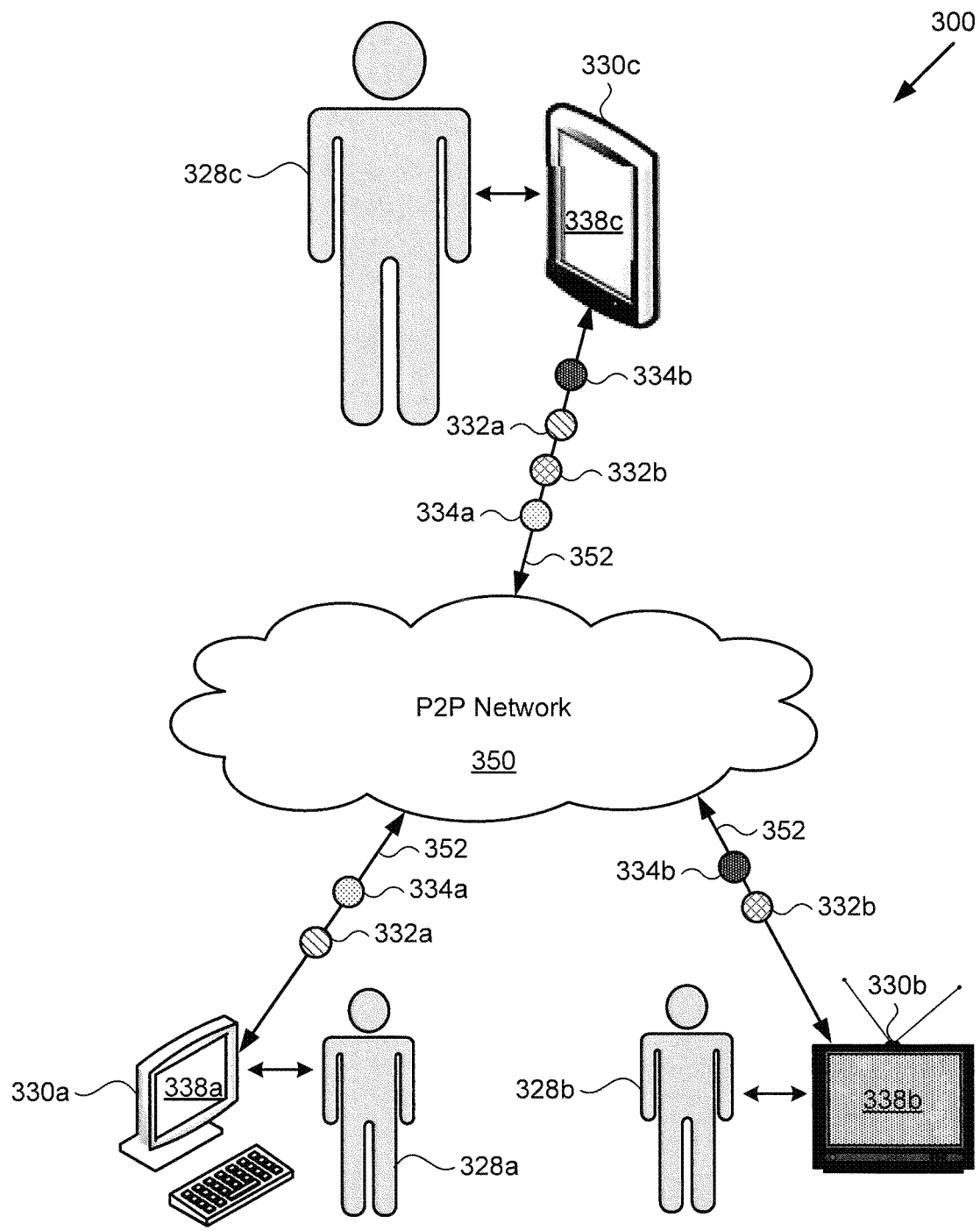
FIG. 3 shows a diagram of an exemplary system for coordinating delivery of media content to multiple media players, according to another implementation.

FIG. 3 shows a diagram of exemplary system 300 for coordinating delivery of media content to multiple media players, according to another implementation. As shown in FIG. 3, system 300 includes mutually remote media players 330*a*, 330*b*, and 330*c* interactively connected over peer-to-peer (p2p) network 350 and network communication links 352. In addition, FIG. 3 shows users 328*a*, 328*b*, and 328*c* and displays 338*a*, 338*b*, and 338*c* of respective media players 330*a*, 330*b*, and 330*c*. Also shown in FIG. 1 are state message 332*a* provided by media player 330*a*, state message 332*b* provided by media player 330*b*, and content coordination messages 334*a* and 334*b* output to respective media players 330*a* and 330*b* by media player 330*c*.

According to the implementation shown in FIG. 3, users 328*a*, 328*b*, and 328*c* can utilize respective media players 330*a*, 330*b*, and 330*c* to participate in a shared and substantially synchronized content consumption experience of different instantiations of the same media content. However, and in contrast to the implementations shown by FIGS. 1 and 2, media player 330*c* provides the playout coordination service enabling users 328*a*, 328*b*, and 328*c* to participate interactively in the shared media consumption experience using respective media players 330*a*, 330*b*, and 330*c*.

It is noted that although media player 330*a* is shown as a desktop computer, while media player 330*b* is shown as a smart TV and media player 330*c* is shown as a smartphone, those representations are merely exemplary. More generally, media players 330*a*, 330*b*, and 330*c* may be implemented using any suitable mobile or stationary computing device or system capable of performing data processing sufficient to provide a user interface, support connections to p2p network 350, and implement the functionality ascribed to media players 330*a*, 330*b*, and 330*c* herein. For example, in other implementations, one or more of media players 330*a*, 330*b*, and 330*c* may take the form of a laptop computer, a tablet computer, or a gaming console, for example.

It is further noted that displays 338*a*, 338*b*, and 338*c* of respective media players 330*a*, 330*b*, and 330*c* may be implemented as LCDs, LED displays, OLED displays, or another suitable display screens that perform a physical transformation of signals to light. It is also noted that, in some implementations, one or more of displays 338*a*, 338*b*, and 338*c* may be implemented as an AR, VR, or holographic display, or may take the form of an audio, braille, or other output device providing to accessibility to a disabled user.

Figure 4:
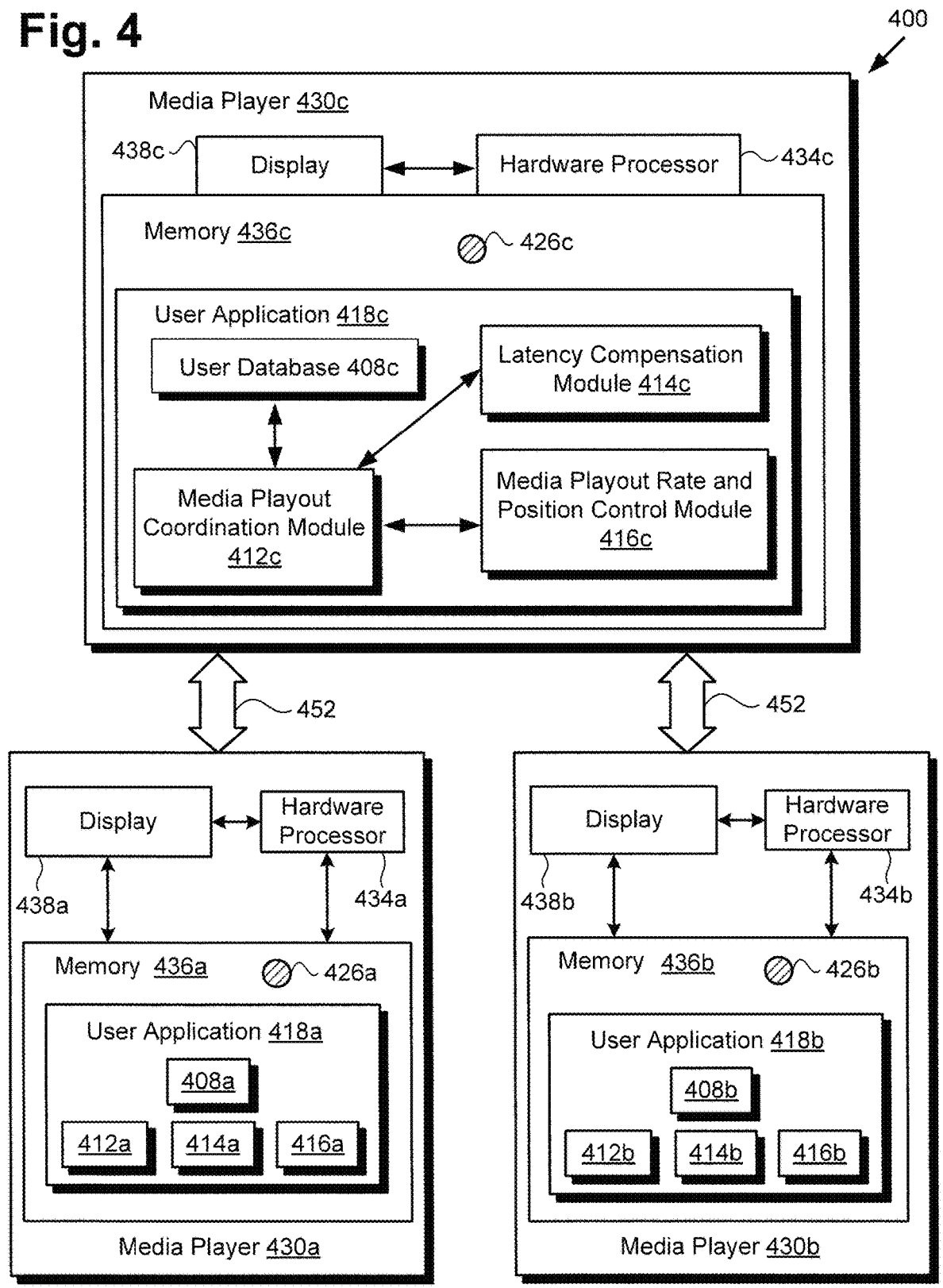
FIG. 4 shows a more detailed representation of the exemplary system for coordinating delivery of media content to multiple media players of FIG. 3, according to one implementation.

FIG. 4 shows a more detailed representation of the exemplary system for coordinating delivery of media content to multiple media players of FIG. 3, according to one implementation. As shown in FIG. 4, system 400 includes media player 430*c* interactively connected to media players 430*a* and 430*b* over network communication links 452. As further shown in FIG. 4, media player 430*c* includes display 438*c*, hardware processor 434*c*, and memory 436*c* implemented as a non-transitory storage device storing user application 418*c*. According to the exemplary implementation shown in FIG. 4, user application 418*c* includes user database 408*c*, media playout coordination module 412*c*, latency compensation module 414*c*, media playout rate and position control module 416*c*.

As also shown in FIG. 4, media player 430*a* includes display 438*a*, hardware processor 434*a*, and memory 436*a* storing user application 418*a*, while media player 430*b* includes display 438*b*, hardware processor 434*b*, and memory 436*b* storing user application 418*b*. It is noted that memory 436*a* and memory 436*b* of respective media players 430*a* and 430*b* are non-transitory storage devices. According to the present exemplary implementation, user application 418*a* includes user database 408*a*, media playout coordination module 412*a*, latency compensation module 414*a*, and media playout rate and position control module 416*a*, while user application 418*b* includes user database 408*b*, media playout coordination module 412*b*, latency compensation module 414*b*, and media playout rate and position control module 416*b*. Also shown in FIG. 4 are first media content 426*a*, second media content 426*b*, and third media content 426*c*, each of which is the same content.

Network communication links 452 and media players 430*a*, 430*b*, and 430*c* having respective displays 438*a*, 438*b*, and 438*c* correspond respectively in general to network communication links 352 and media players 330*a*, 330*b*, and 330*c* having respective displays 338*a*, 338*b*, and 338*c*, in FIG. 3. In other words, media players 330*a*, 330*b*, and 330*c*, and displays 338*a*, 338*b*, and 338*c* may share any of the characteristics attributed to corresponding media players 430*a*, 430*b*, and 430*c*, and displays 438*a*, 438*b*, and 438*c* by the present disclosure, and vice versa. Thus, although not shown in FIG. 3, media player 330*c* may include features corresponding to hardware processor 434*c* and memory 436*c* storing user application 418*c* and third media content 426*c*. Moreover, media player 330*a* may include features corresponding to hardware processor 434*a* and memory 436*a* storing user application 418*a* and first media content 426*a*, while media player 330*b* may include features corresponding to hardware processor 434*b* and memory 436*b* storing user application 418*b* and second media content 426*b*.

According to the exemplary implementation shown in FIG. 4, each of user applications 418*a*, 418*b*, and 418*c* may include respective user database 408*a*, 408*b*, and 408*c*, media playout coordination module 412*a*, 412*b*, and 412*c*, latency compensation module 414*a*, 414*b*, and 414*c*, and media playout rate and position control module 416*a*, 416*b*, and 416*c*. However, only one of media players 330*a*/430*a*, 330*b*/430*b*, and 330*c*/430*c* (i.e., media player 330*c*/430*c*) acts as a controlling host for the coordinated content consumption experience enjoyed by users 328*a*, 328*b*, and 328*c*.

As noted above by reference to FIG. 3, in contrast to the implementations shown by FIGS. 1 and 2, media player 330*c*/430*c* provides the playout coordination service enabling users 328a, 328b, and 328c to participate interactively in the shared media consumption experience using respective media players 330a/430a, 330b/430b, and 330c/430c. Thus, in the implementation shown in FIGS. 3 and 4, computing platform 102/202 providing the content coordination service for first media content 426a, second media content 426b, and third media content 426c is integrated with media player 330c/430c executing third media content 426c.

Moreover, in the implementations shown in FIGS. 3 and 4, software code 110/210 takes the form of any one of user applications 418a, 418b, and 418c. That is to say, according to the exemplary use case in which media player 330c/430c provides the playout coordination service for media players 330a/430a and 330b/430b, user application 418c residing on media player 330c/430c may have all of the features and functionality of software code 110/210 enabled. In addition, in that exemplary use case, user applications 418a and 418b may function as client applications for communicating with media player 330c/430c and implementing the content coordination state included in respective content coordination messages 334a and 334b.

The functionality of systems 100/200/300/400 will be further described by reference to FIG. 5 in combination with FIGS. 1, 2, 3, and 4 (hereinafter "FIGS. 1-4"). FIG. 5 shows flowchart 560 presenting an exemplary method for use by a system for synchronizing media content playout, according to one implementation. With respect to the method outlined in FIG. 5, it is noted that certain details and features have been left out of flowchart 560 in order not to obscure the discussion of the inventive features in the present application.

Referring now to FIG. 5 in combination with FIGS. 1-4, flowchart 560 begins with receiving first state message 132a/332a or 132b/332b from one of media players 130a/230a/330a/430a or 130b/230b/330b/430b (action 561). It is noted that in the interests of conceptual clarity, state message 132a/332a will be referred to as "first state message 132a/332a," while media player 130a/230a/330a/430a will hereinafter be referred to as "first media player 130a/230a/330a/430a." Thus, action 561 corresponds to receiving first state message 132a/332a from first media player 130a/230a/330a/430a playing first media content 126a/226a/426a. Moreover, media player 130b/230b/330b/430b will hereinafter be referred to as "second media player 130a/230a/330a/430a," and state message 132b/332b will be referred to as "second state message 132b/332b." However, it is emphasized that the designation of media player 130a/230a/330a/430a as "first media player" and media player 130b/230b/330b/430b as "second media player" is purely arbitrary, and in other implementations those roles may be reversed.

In some implementations, first media content 126a/226a/426a, as well as second media content 126b/226b/426b, may be live content. For example, first media content 126a/226a/426a may be a live video feed streamed to first media player 130a/230a/330a/430a from content server 124.

In other implementations, first media content 126a/226a/426a and second media content 126b/226b/426b may be recorded media content. For example, first media content 126a/226a/426a may be a data stream of movie content or television programming content, for example, received by first media player 130a/230a/330a/430a from content server 124. Alternatively, in some implementations, first media content 126a/226a/426a may be a digital media file of movie content or television programming content, for example, stored locally on first media player 130a/230a/330a/430a.

First state message 132a/332a includes information regarding the state of first media player 130a/230a/330a/430a with respect to a multiple-user playback session, or the condition of first media player 130a/230a/330a/430a, or an action by the user with respect to the playback of a video. Examples of data contained in first state message 132a/332a, as well as second state message 132b/332b include user activity data describing session-related user actions such as "user creates session" or "user joins session" as well as user playback actions such as "user triggers media play" or "user triggers medial pause" or "user seeks media to playhead position X." Other examples of user activity data, as well as accompanying metadata, are shown in FIG. 6. User activity data may be included, together with related metadata, in first state message 132a/332a provided by first media player 130a/230a/330a/430a. In various implementations, first state message 132a/332a and second state message 132b/332b may correspond to a singular user action, or to ongoing, cumulative, user actions.

For example, when corresponding to a singular user action, first state message 132a/332a and second state message 132b/332b may describe any one of a variety of user actions such as begin playout, pause playout, resume playout, for instance, or to an operating state or connectivity state of first media player 130a/230a/330a/430a and second media player 130b/230b/330b/430b. When corresponding to ongoing user actions, first state message 132a/332a and second state message 132b/332b may describe all, or a subset of all of the user actions relating to consumption of respective first media content 126a/226a/426a and second media content. FIG. 6 presents list 600 of exemplary state messages including user activity data and metadata. In addition to the metadata descriptions provided in FIG. 6, first state message 132a/332a and second state message 132b/332b may include the type of network connection being used, e.g., Wi-Fi or cellular, as well as the type of device that includes the media player, e.g., smartphone, tablet computer, or smart TV.

First state message 132a/332a may be received from first media player 130a/230a/330a/430a in response to actions taken by user 128a/328a, as shown by the exemplary state messages included in FIG. 6. In addition, in some implementations, first state message 132a/332a may be received from first media player 130a/230a/330a/430a based on a schedule, even in the absence of an action by user 128a/328a. That is to say, in some implementations, first state message 132a/332a may be received from first media player 130a/230a/330a/430a in the form of a "state message heartbeat" provided periodically by first media player 130a/230a/330a/430a. It is noted that as used herein, the term "state message heartbeat" refers to a periodic state message that occurs automatically in the absence of other trigger events, such as an affirmative user action, for example.

In the implementation shown by FIGS. 1 and 2, first state message 132a may be received by software code 110/210, executed by hardware processor 104/204 of computing platform 102/202, and using media playout coordination module 112/212. According to the implementation shown by FIGS. 3 and 4, however, first state message 332a may be received by user application 418c, executed by hardware processor 434c of media player 330c/430c, and using media playout coordination module 412c.

It is emphasized that the designation of media player 330c/430c as a controlling host for the coordinated content consumption experience enjoyed by users 328a, 328b, and 328c is purely arbitrary. In other implementations of system 300/400, action 561, as well as actions 562, 563, and 564 described below, may be performed by either of user applications 418a or 418b, executed by respective hardware processors 434a and 434b.

Flowchart 560 continues with receiving second state message 132b/332b from second media player 130b/230b/330b/430b playing second media content 126b/226b/426b, where first media content 126a/226a/426a and second media content 126b/226b/426b are the same media content (action 562). Examples of the type of data, including user activity data and metadata, included in second state message 132b/332b are described above by reference to first state message 132a/332a and FIG. 6.

In the implementation shown by FIGS. 1 and 2, second state message 132b may be received by software code 110/210, executed by hardware processor 104/204 of computing platform 102/202, and using media playout coordination module 112/212. According to the implementation shown by FIGS. 3 and 4, however, second state message 332a may be received by user application 418c, executed by hardware processor 434c of media player 330c/430c, and using media playout coordination module 412c.

Flowchart 560 continues with determining a coordination state (hereinafter also "desired coordination state") for playout of first media content 126a/226a/426a by first media player 130a/230a/330a/430a and second media content 126b/226b/426b second media player 130b/230b/330b/430b based on one or more of first state message 132a/332a and second state message 132b/332b (action 563). In some implementations, the desired coordination state for first and second media players 130a/230a/330a/430a and 130b/230b/330b/430b may be determined based on the most recent state message received from either of first or second media players 130a/230a/330a/430a or 130b/230b/330b/430b. However, in other implementations, other criteria may be employed to determine the desired coordination state.

For example, referring to FIGS. 3 and 4, a voting system may be used to determine the desired coordination state based on state messages received from one or more of first and second media players 330a/430a, 330b/430b, and 330c/430c. As a specific example, when one of first media player 330a/430a, second media player 330b/430b, and media player 330c/430c initiates a change in playhead position to a new playhead location, the content coordination service provided by computing platform 102/202 or media player 330c/430c may send a message to all other media players describing the change and seeking approval or disapproval. If a majority, or any other predetermined plurality of users of the other media players agrees, the new playhead location becomes the desired coordination state. If the majority or other predetermined plurality of users of the other media players disagrees, there is no change in coordination state.

As another example, one or more of first media player 330a/430a, second media player 330b/430b, and media player 330c/430c may be assigned a higher priority when coordinating delivery or playout of the same content, based on a predetermined hierarchy (e.g., leader/organizer status, loyalty status, etc.) of respective users 328a, 328b, and 328c, for instance. In some of those implementations, the desired coordination state may be determined by selecting a state message received from a media player that is identified (e.g., based on a user ID) as having higher priority, regardless of the order in which state messages are received from first media player 330a/430a, second media player 330b/430b, and media player 330c/430c.

As yet another example, in some use cases, a state message received from one or more users may be ignored, either on a user-specific or session specific basis. For instance, a user engaging in disruptive behavior during a shared media content consumption session may have their state messages excluded from consideration when determining desired coordination states for the remainder of that session. A user who consistently engages in such bad behavior may have their state messages persistently excluded from consideration when determining desired coordination states during all future sessions.

In the implementation shown by FIGS. 1 and 2, the desired coordination state may be determined by software code 110/210, executed by hardware processor 104/204 of computing platform 102/202, and using media playout rate and position control module 116/216. According to the implementation shown by FIGS. 3 and 4, however, the desired coordination state may be determined by user application 418c, executed by hardware processor 434c of media player 430c, and using media playout rate and position control module 416c.

Flowchart 560 can conclude with transmitting first content coordination message 134a/334a including the desired coordination state to first media player 130a/230a/330a/430a, and second content coordination message 134b/334b also including the desired coordination state to second media player 130b/230b/330b/430b, to substantially synchronize, using the desired coordination state, playout of first media content 126a/226a/426a and second media content 126b/226b/426b by first media player 130a/230a/330a/430a and second media player 130b/230b/330b/430b, respectively (action 564).

First and second content coordination messages 134a/334a and 134b/334b include data that is formatted to provide information to respective first and second media players 130a/230a/330a/430a and 130b/230b/330b/430b and is used by the media players to take action to adjust the playback of the content so that playback may be synchronized for the users of the media players. In some implementations, the first and second content coordination messages 134a/334a and 134b/334b may include basic data that is interpreted locally by the media players into playback instructions, while in other implementations first and second content coordination messages 134a/334a and 134b/334b are formulated into media player instructions by computing platform 102/202 and delivered to the media players.

As noted above, first and second content coordination messages 134a/334a and 134b/334b are provided by system 100/200/300/400 to substantially synchronize playout of first and second media content 126a/226a/426a and 126b/226b/426b by respective first and second media players 130a/230a/330a/430a and 130b/230b/330b/430b. Consequently, and depending on the content playout states of first and second media players 130a/230a/330a/430a and 130b/230b/330b/430b relative to one another, first and second content coordination messages 134a/334a and 134b/334b may cause one or both of first and second media players 130a/230a/330a/430a and 130b/230b/330b/430b to increase the rate at which the media content is played out, decrease the rate at which the media content is played out, or change a position of its playhead entirely. In use cases in which one or more of first and second content coordination messages 134a/334a and 134b/334b result in a change in playhead position, such a change in playhead position may be with respect to the timecode or frame number of the content.

In the implementation shown by FIGS. 1 and 2, content coordination message 134a and 134b may be output to respective first and second media players 130a/230a and 130b/230b by software code 110/210, executed by hardware processor 104/204 of computing platform 102/202, and using communication network 120. According to the implementation shown by FIGS. 3 and 4, however, content coordination messages 334a and 334b may be output to respective first and second media players 330a/430a and 330b/430b by user application 418c, executed by hardware processor 434c of media player 430c, and using p2p network 350.

Moreover, according to the implementations shown in FIGS. 1 and 2, in some use cases, hardware processor 104/204 may execute software code 110/210 to periodically receive first and second state message 132a and 132b, determine the desired coordination state, and transmit the desired coordination state to first and second media players 130a/230a and 130b/230b to maintain synchronization of playout of first and second media content 126a/226a and 126b/226b by first and second media player 130a/230a and 130b/230b, respectively. Analogously, according to the implementations shown in FIGS. 3 and 4, in some use cases, hardware processor 434c may execute user application 418c to periodically receive first and second state message 332a and 332b, determine the desired coordination state, and transmit the desired coordination state to first and second media players 330a/430a and 330b/430b to maintain synchronization of playout of first and second media content 426a and 426b by first and second media player 330a/430a and 330b/430b, respectively.

It is noted that changes in playout rate, i.e., increase or decrease of playout rate, of less than approximately thirteen percent may be substantially imperceptible to a user. As a result, where desynchronization between first and second media players 130a/230a/330a/430a and 130b/230b/330b/430b can be remedied through changes in playout rate of less than thirteen percent of either or both of first and second media players 130a/230a/330a/430a and 130b/230b/330b/430b, changing the playout rate of first and second media players 130a/230a/330a/430a and 130b/230b/330b/430b may be the preferred option. However, in use cases in which synchronization of first and second media players 130a/230a/330a/430a and 130b/230b/330b/430b requires a greater change in playout rate, it may be advantageous to change the playhead position of one or both of first and second media players 130a/230a/330a/430a and 130b/230b/330b/430b.

It is also noted that, as known in the art, individual media players typically have their own protocols for controlling playout rate, which may be accessed by media distribution systems such as the systems described in this disclosure. Consequently, the specific techniques used to adjust the rate of playout may vary with each different type of media player. For example, in some instances, a particular media player may increase playout rate through frame dropping, or decrease through frame doubling. That is to say, in response to the desired coordination state included in first and second content coordination messages 134a/334a and 134b/334b, each of first and second media players 130a/230a/330a/430a and 130b/230b/330b/430b may adjust its own playout rate based on its current local state when compared to the desired coordination state.

Although not included in flowchart 560, in some implementations, the present method may include starting a timer in response to receiving first state message 132a/332a. By way of example, when first state message 132a/332a is received in action 561, computing platform 102/202 or media player 330c/430c may begin a debounce timer to gracefully handle situations where more than one of first state message 132a/332a and second state message 132b/332b are being received in rapid succession. Upon receipt of first state message 132a/332a, computing platform 102/202 or media player 330c/430c may start a timer to keep track of this in the following manner: When another of first state message 132a/332a or second state message 132b/332b is received from one of first media player 130a/230a/330a/430a or second media player 130b/230b/330b/430b before the timer reaches the predetermined debounce time interval, the timer may be reset.

In the implementation shown by FIGS. 1 and 2, the timer may be started and may be reset by software code 110/210, executed by hardware processor 104/204 of computing platform 102/202, and using media playout coordination module 112/212. According to the implementation shown by FIGS. 3 and 4, however, the timer may be started and may be reset by user application 418c, executed by hardware processor 434c of media player 330c/430c, and using media playout coordination module 412c.

Figure 7:
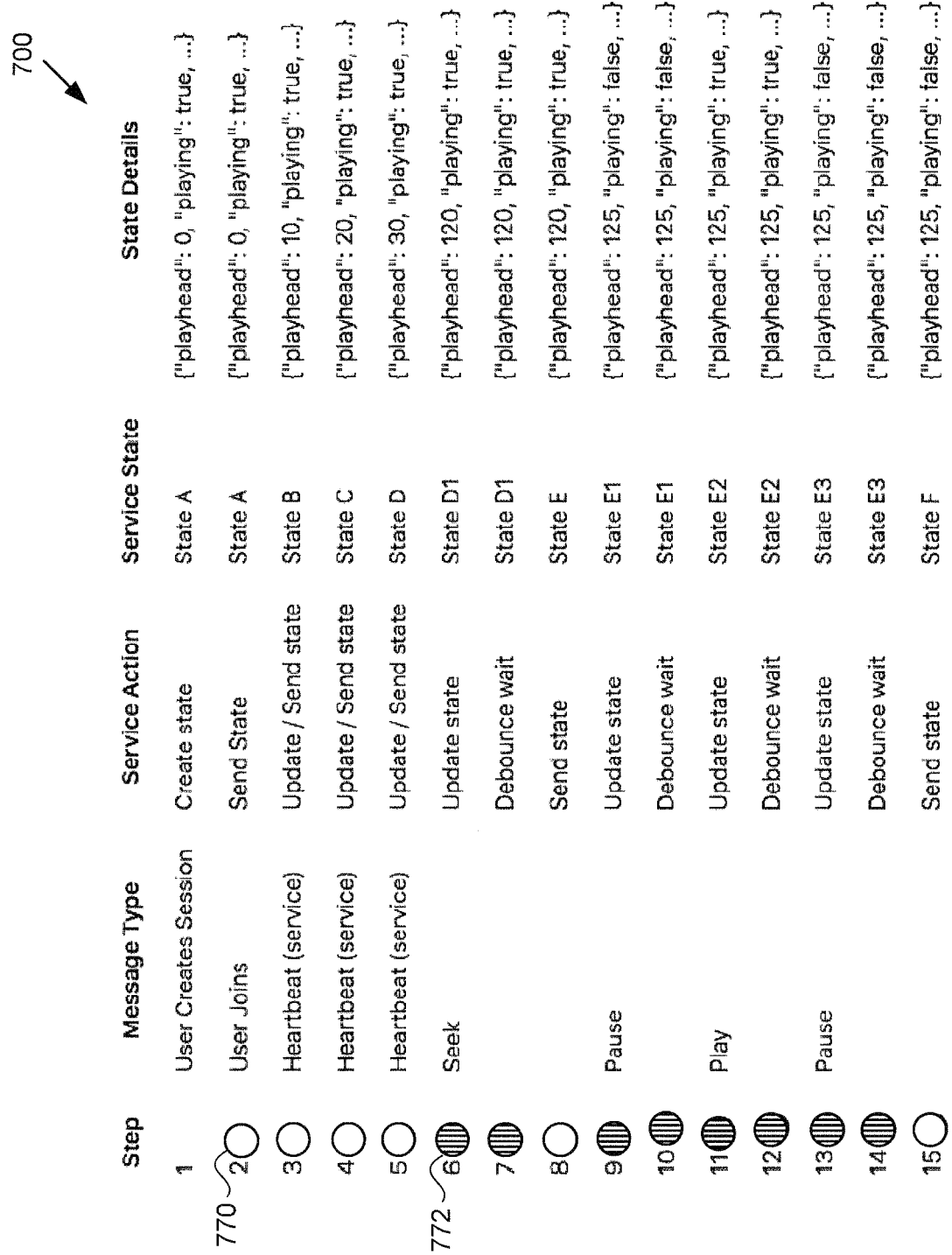
FIG. 7 shows an exemplary table of messages that demonstrates the effect of a debounce time interval on the coordination of media content delivery, according to one implementation.

FIG. 7 shows exemplary table 700 of messages exchanged between computing platform 102/202 or media player 330c/430c and first and second media players 130a/230a/330a/430a and 130b/230b/330b/430b that demonstrates the effect of the debounce time interval discussed above. Non-patterned (white) buttons 770 designate messages being sent from computing platform 102/202 or media player 330c/430c to first and second media players 130a/230a/330a/430a and 130b/230b/330b/430b. Patterned (lined) buttons 772 designate receipt of first or second state message 132a/332a or 132b/332b by computing platform 102/202 or media player 330c/430c in rapid succession, i.e., several instances of first state message 132a/332a or second state message 132b/332b being received during the debounce time interval. After the debounce time interval expires, hardware processor 104/204 may execute software code 110/210, or hardware processor 434c may execute user application 418c, to determine the desired coordination state for synchronizing playout of first media content 126a/226a/426a by first media player 130a/230a/330a/430a with playout of second media content 126b/226b/426b by second media player 130b/230b/330b/430b.

As a specific example, and continuing to refer to FIG. 7, when the content coordination service provided by computing platform 102/202 or media player 330c, 430c is in a debounce wait mode as shown by steps 10, 12, and 14 of table 700, first state message 132a/332a or second state message 132b/332b received in the messages of steps 9, 11, and 13 are combined to determine a desired coordination state for advancing from the previous state (step 8). That functionality may apply regardless of how many instances of first state message 132a/332a or second state message 132b/332b are received before the debounce time interval elapses (e.g., see steps 6, 7, and 8).

Although also not included in flowchart 560, in some implementations, it may be advantageous or desirable to determine the latency associated with communications between computing platform 102/202 and each of first and second media players 130a/230a and 130b/230b, or the latency associated with communications between media player 330c/430c and each of first and second media players 330a/430a and 330b/430b.

With respect to the implementation shown by FIGS. 1 and 2, the latency between computing platform 102/202 and each of first and second media players 130a/230a and 130b/230b may be estimated or determined by computing platform 102/202, using latency compensation module 114/214 of software code 110/210, for example, or by each of first and second media players 130a/230a and 130b/230b, using respective latency compensation modules 214a and 214*b* of respective user applications 218*a* and 218*b*. That is to say, in some implementations, hardware processor 104/204 may execute software code 110/210 to receive a first latency estimate from first media player 130*a*/230*a* and a second latency estimate from second media player 130*b*/230*b*.

By analogy, a determination of the latency between media player 330*c*/430*c* and each of first and second media players 330*a*/430*a* and 330*b*/430*b* can be estimated or determined by media player 330*c*/430*c*, using latency compensation module 414*c* of user application 418*c*, for example, or by each of first and second media players 330*a*/430*a* and 330*b*/430*b*, using respective latency compensation modules 414*a* and 414*b* of respective user applications 418*a* and 418*b*. Thus, in some implementations, hardware processor 434*c* may execute user application 418*c* to receive a first latency estimate from first media player 330*a*/430*a* and a second latency estimate from second media player 330*b*/430*b*.

Figure 8:
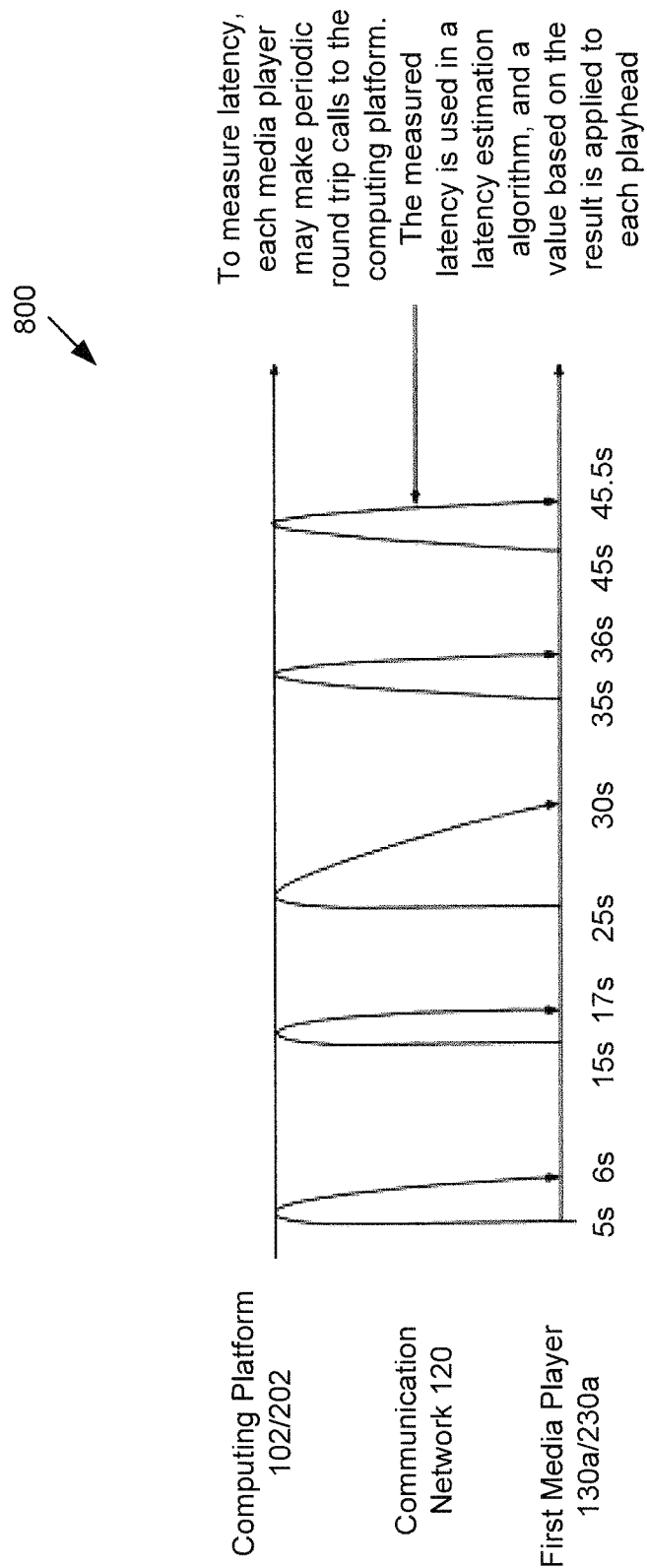
FIG. 8 shows a diagram illustrating the gathering of latency data to be input to a latency estimator.

As an example of how latency may be determined, a specific implementation in which first media player 130*a*/230*a* determines the latency of its communications with computing platform 102/202 will be considered. However, it is noted that the process described below is readily adapted for use by computing platform 102/202 or any of media players 130*b*/230*b*, 330*a*/430*a*, 330*b*/430*b*, or 330*c*/430*c*. FIG. 8 shows diagram 800 illustrating the gathering of latency data to be input to a latency estimator.

Referring specifically to first media player 130*a*/230*a*, communication network 120, and computing platform 102/202, in one implementation, each time computing platform 102/202 sends a message to first media player 130*a*/230*a* or first media player 130*a*/230*a* sends a message to computing platform 102/202 there will be a latency time difference between when the message is sent and when the message is received. To improve the precision of the present solution for achieving substantial playhead synchronization, it is desirable to determine a predicted amount of this latency for each message and apply synchronization correction as described below.

As shown in FIG. 8, first media player 130*a*/230*a* may periodically make ping requests to computing platform 102/202 in order to determine the time elapsed for a communication round trip. A latency value (hereinafter also "test latency value") based on the time duration of each ping round trip may be stored in a circular drift buffer that keeps track of the "N" most recently stored test latency values, where N is a configurable parameter of the present exemplary latency determination process. The test latency values in the drift buffer may then be used to calculate a rolling average, which may be a weighted rolling average or an exponential rolling average, for example.

For instance, one implementation may include computing the rolling average of the test latency values in the drift buffer such that each test latency value in the drift buffer is weighted by how recent it is, i.e., more recent values being given greater weight. In addition, or alternatively, the weighting applied to each test latency value in the drift buffer may be based on its deviation from the current standard average of the drift buffer values, i.e., either a standard mean or median value of the test latency values in the drift buffer. That is to say, the test latency values having greater deviation from the standard mean or median value may be given lower weight in order to reduce the effect of outliers on the latency determination.

As a specific example of the foregoing, we assume the following test latency values in a ten element drift buffer, with the oldest value listed first and the most recent value listed last: 0.053, 0.048, 0.017, 0.012, 0.047, 0.049, 0.044, 0.028, 0.61, 0.034. It is noted that the exemplary test latency values used in this example differ from those exemplary test latencies shown in FIG. 8. For each of the present test latency values we can calculate a recency weight based on a linear mapping of how recent the test latency value is, from a domain of [0, count of elements−1] to a range of [0.5, 1.0], such that the most recent test latency value is mapped to 1.0, and the oldest test latency value is mapped to 0.5. For example, in the above set the test latency value of "0.61" would be assigned a recency weight close to 1.0, because it is the second most recent test latency value.

Also, for each of these test latency values we can calculate a deviation weight based on an exponential mapping of how much each test latency value deviates from the standard average, from a domain of [0.0, maximum deviation] to a range of [0.0, 1.0] such that the maximally deviant test latency value is mapped to 0.0. It is noted that, as used herein, the expression "exponential mapping" may refer to the linear mapping squared, i.e., (linear mapping)$^2$. It is further noted that an exponential mapping is used in this example so that significant outliers are greatly diminished in weight. For example, in the above set the test latency value of "0.61" would be assigned an extremely low deviation weight, close to 0.0, because this test latency value deviates significantly more from the standard average of all of the test latency values, i.e., 0.0952, than any other test latency value in the drift buffer.

Now, for each element of the drift buffer, both weights can be combined via multiplication into a composite weighted value for each element identified as "CombinedWeight." For example, in the above set the test latency value of "0.61" would have a very low, close to 0.0, CombinedWeight, because while its recency weight is high (see above), its deviation weight will be extremely low (see above).

Based on the above, the weighted rolling average of the drift buffer elements can be calculated as follows:

$$\frac{\text{SUM}(driftValue * driftValue\text{'s } CombinedWeight)}{\text{SUM}(driftValue\text{'s } CombinedWeight)}$$

Note: For the above sample set this weighted average is approximately 0.0372, in contrast with the standard average: 0.0952

The rolling average may then be factored into the sending and processing of communications between first media player 130*a*/230*a* and computing platform 102/202 to improve playhead synchronization. For example, when the playhead of first media player 130*a*/230*a* is in a playing state and first media player 130*a*/230*a* seeks to a new playhead time "X," first state message 132*a*/332*a* sent by first media player 130*a*/230*a* to computing platform 102/202 will add an offset to X derived from the above-computed rolling average. Moreover, first media player 130*a*/230*a* can utilize the offset to determine the latency of first content coordination message 134*a*/334*a* output to first media player 130*a*/230*a* by software code 110/210 of computing platform 102/202.

To further promote the experience of substantially seamless content synchronization, the latency associated with communications between computing platform 102/202 and first media players 130*a*/230*a*, for example, may factor into how first content coordination message 134*a* is applied by first media player 130*a*/230*a* in response to action 565. For instance, in one implementation, if the playhead position of first media player 130*a*/230*a* is within a predetermined threshold difference from the desired coordination state specified in first content coordination message 134*a*, adjusted for latency, no modification is made to the playhead position of media player 130*a*/230*a*.

In use cases in which the playhead position of first media player 130*a*/230*a* differs from the desired coordination state specified in first content coordination message 134*a*, adjusted for latency, by more than the above-discussed predetermined threshold distance, but less than another predetermined threshold distance, then another synchronization strategy may be employed. For example, the playout rate of first media player 130*a*/230*a* may be modified, as discussed above, by a small percentage for a computed time interval such that the playhead of first media player 130*a*/230*a* will arrive in proper synchronization at the end of the time interval, which may be a heartbeat interval, for instance.

As a specific example: if the playhead position of first media player 130*a*/230*a* is 0.3 seconds ahead of a slower player, the playout rate of first media player 130*a*/230*a* may be adjusted down by ten percent for a duration of 3 seconds. The playout rate of first media player 130*a*/230*a* reverts to the default playout rate at the conclusion of this duration or when subsequent content coordination message 134*a* is received. As noted above, the percentage by which the playout rate is modified may be chosen such that this modification will be largely imperceptible to user 128*a* of first media player 130*a*/230*a*.

In use cases in which the playhead position of first media player 130*a*/230*a* differs from the desired coordination state specified in first content coordination message 134*a*, adjusted for latency, by more than both of the above-described predetermined threshold differences, the playout rate of first media player 130*a*/230*a* may not be changed. Instead, the playhead of first media player 130*a*/230*a* may be moved directly to the playhead position of the desired coordination state (e.g., via a "skipping" or "seeking" instruction included in first content coordination message 134).

Figure 9:
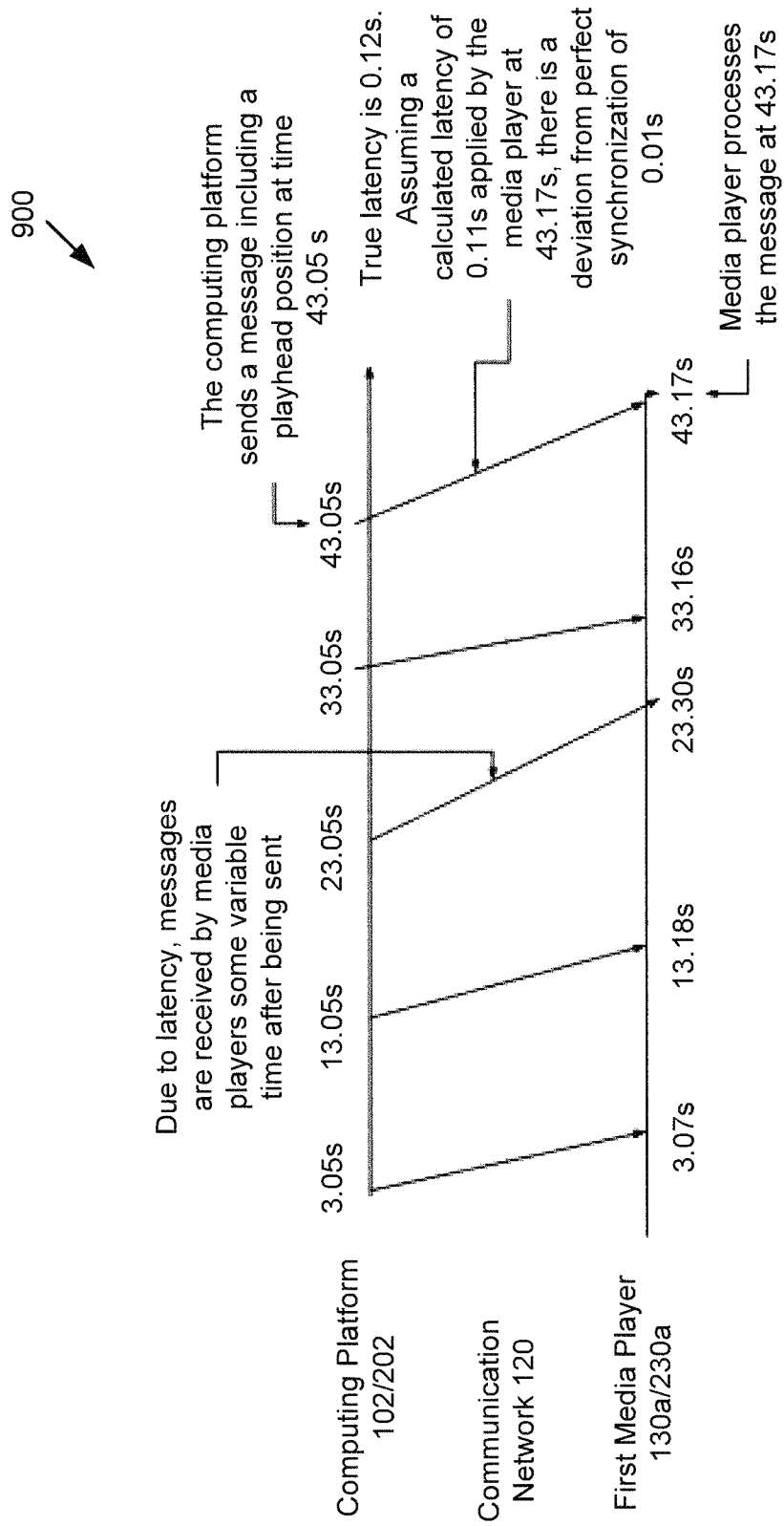
FIG. 9 shows a diagram illustrating the effects of latency on communications between a media player and a system for coordinating delivery of media content to multiple media players, according to one exemplary implementation.

It is noted that the predetermined threshold differences alluded to above are configurable parameters of the present approach. An example of how latency can affect the exchange and processing of messages between computing platform 102/202 and first media player 130*a*/230*a* is shown by FIG. 9. It is further noted that in implementations in which the latency between computing platform 102/202 and first media player 130*a*/230*a* is determined by computing platform 102/202, first content coordination message 134*a* may include a first latency estimate for communications between computing platform 102/202 and first media player 130*a*/230*a*.

FIG. 10 shows flowchart 1080 presenting an exemplary method for use by first media player 130*a*/230*a*/330*a*/430*a* for synchronizing playout of first media content 126*a*/226*a*/426*a* with playout of second media content 126*b*/226*b*/426*b* by second media player 130*b*/230*b*/330*b*/430*b*, according to one implementation. It is noted that in the interests of conceptual clarity, the method outlined by flowchart 1080 will be described by reference to the exemplary implementation shown by FIGS. 1 and 2. Nevertheless, it is emphasized that the present method is equally applicable to the implementation shown by FIGS. 3 and 4. It is further noted, that computing platform 102/202 will be referred to as "coordinating device 102/202" in the description provided below.

Flowchart 1080 begins with starting to play media content by a first of multiple media players each playing the same media content (action 1081). For example, referring to FIGS. 1 and 2, first media player 130*a*/230*a* may start to play first media content 126*a*/226*a*. Flowchart 1080 continues with transmitting a state message to a coordinating device for playout of the media content by the multiple media players (action 1082). Continuing to refer to FIGS. 1 and 2, first state message 132*a* may be transmitted to coordinating device 102/202 by first media player 130*a*/230*a* while first media player 130*a*/230*a* is playing first media content 126*a*/226*a*. First state message 132*a* may include one or more of a playhead position, a media content playout rate, and a network connection status of first media player 130*a*/230*a*.

Flowchart 1080 continues with receiving a content coordination message from the coordinating device, where the content coordination message includes a coordination state for playout of the media content that is determined by one or both of the state message transmitted in action 1082 and another state message transmitted to the coordinating device by another media player playing the media content (action 1083). For example, first media player 130*a*/230*a* may receive first content coordination message 134*a* from coordinating device 102/202, first content coordination message 134*a* including a desired coordination state for playout of first media content 126*a*/226*a* by first media player 130*a*/230, the coordination state being based one or more of first state message 132*a* and second state message 132*b* transmitted by second media player 130*b*/230*b* to coordinating device 102/202.

Flowchart 1080 further continues with synchronizing playout of the media content by the first media player with playout of the media content by the other media players, using the content coordination state (action 1084). That is to say, playout of first media content 126*a*/226*a* by first media player 130*a*/230*a* may be synchronized with playout of second media content 126*b*/226*b* by second media player 130*b*/230*b* using the content coordination state included in content coordination message 134*a*. According to the exemplary method outlined in FIG. 10, flowchart 1080 can conclude with continuing to playout the media content during and after the synchronizing (action 1085). Thus, first media content 126*a*/226*a* continues to be played out by first media player 130*a*/230*a* during and after action 1084.

Although not included in flowchart 1080, in some implementations, the present method may include determining, by first media player 130*a*/230*a*, a first latency estimate for communications with coordinating device 102/202. In those implementations, the present method may further include transmitting, by first media player 130*a*/230*a*, the first latency estimate to coordinating device 102/202 as part of first state message 132*a*. Alternatively, or in addition, the present method may further include receiving, by first media player 130*a*/230*a*, the first latency estimate from coordinating device 102/202. Furthermore, in some implementations, first media player 130*a*/230*a* may periodically transmit first state message 132*a*, receive second state message 132*b*, receive first content coordination message 134*a*, and synchronize, using first content coordination message 134*a*, playout of first media content 126*a*/226*a* with playout of second media content 126*b*/226*b* by second media player 130*b*/230*b*.

Thus, the present application discloses systems and methods for coordinating delivery of media content to multiple media players. The disclosed systems and methods provide a robust solution enabling multiple media players to concurrently render substantially synchronized content that is applicable to live content as well as recorded media content. According to various implementations of the present inventive principles, each media player has a bidirectional and persistent connection to a content coordination service. Each media player individually streams or otherwise accesses a different instantiation of the same media content rather than sharing a single streaming session that is mirrored to each media player.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for synchronizing media content playout, the system comprising:
   a computing platform including a hardware processor and a system memory storing a software code;
   the hardware processor configured to execute the software code to:
   receive a first state message from a first media player playing a first media content;
   start a timer for a first time interval after receiving the first state message;
   receive, prior to expiration of the timer started for the first time interval, a second state message from a second media player playing a second media content, the first media content and the second media content being a same media content;
   start the timer for a second time interval after receiving the second state message;
   in response to expiration of the timer started for the second time interval, determine a coordination state for playout of the first media content by the first media player and the second media content by the second media player based on at least one of the first state message or the second state message; and
   in response to expiration of the timer started for the second time interval, transmit a first content coordination message including the coordination state to the first media player, and a second content coordination message including the coordination state to the second media player to synchronize, using the coordination state, playout of the first media content and the second media content by the first media player and the second media player, respectively.

2. The system of claim 1, wherein at least one of the first state message or the second state message includes user activity data corresponding to an action by a user of a respective one of the first media player or the second media player.

3. The system of claim 1, wherein the first content coordination message causes the first media player to change a playout rate of the first media content.

4. The system of claim 1, wherein the first content coordination message causes the first media player to change a position of a playhead of the first media player with respect to one of a timecode and a frame number of the first media content.

5. The system of claim 1, wherein the first content coordination message further includes a first latency estimate for communications between the computing platform and the first media player.

6. The system of claim 5, wherein the first latency estimate is determined based on a weighted rolling average of a plurality of test latency values measured for the first media player.

7. The system of claim 6, wherein a weight applied to each of the plurality of test latency values is based on how recently each test latency value was measured.

8. The system of claim 6, wherein a weight applied to each of the plurality of test latency values is based on a deviation of each of the test latency values from a standard average of the plurality of test latency values.

9. The system of claim 1, wherein receiving the first state message, receiving the second state message, determining the coordination state, and transmitting the coordination state to the first media player and the second media player are all repeated periodically.

10. The system of claim 1, wherein the first state message includes a playhead position, a media content playout rate, and a network connection status of the first media player.

11. A method for use by a system for synchronizing media content playout, the system including a computing platform having a hardware processor and a system memory storing a software code, the method comprising:
   receiving, by the software code executed by the hardware processor, a first state message from a first media player playing a first media content;
   starting, by the software code executed by the hardware processor, a timer for a first time interval after receiving the first state message;
   receiving, by the software code executed by the hardware processor and prior to expiration of the timer started for the first time interval, a second state message from a second media player playing a second media content, the first media content and the second media content being a same media content;
   starting, by the software code executed by the hardware processor, the timer for a second time interval after receiving the second state message;
   in response to expiration of the timer started for the second time interval, determining, by the software code executed by the hardware processor, a coordination state for playout of the first media content by the first media player and the second media content by the second media player based on at least one of the first state message or the second state message; and
   in response to expiration of the timer started for the second time interval, transmitting, by the software code executed by the hardware processor, a first content coordination message including the coordination state to the first media player, and a second content coordination message including the coordination state to the second media player to synchronize, using the coordination state, playout of the first media content and the second media content by the first media player and the second media player, respectively.

12. The method of claim 11, wherein at least one of the first state message or the second state message includes user activity data corresponding to an action by a user of a respective one of the first media player or the second media player.

13. The method of claim 11, wherein the first content coordination message causes the first media player to change a playout rate of the first media content.

14. The method of claim 11, wherein the first content coordination message causes the first media player to change a position of a playhead of the first media player with respect to one of a timecode and a frame number of the first media content.

15. The method of claim 11, further comprising determining a first latency estimate for communications between the computing platform and the first media player.

16. The method of claim 15, wherein the first latency estimate is determined based on a weighted rolling average of a plurality of test latency values measured for the first media player.

17. The method of claim 16, wherein a weight applied to each of the plurality of test latency values is based on how recently each test latency value was measured.

18. The method of claim 16, wherein a weight applied to each of the plurality of test latency values is based on a deviation of each of the test latency values from a standard average of the plurality of test latency values.

19. The method of claim 11, wherein receiving the first state message, receiving the second state message, determining the coordination state, and transmitting the coordination state to the first media player and the second media player are all repeated periodically.

20. The method of claim 11, wherein the first state message includes a playhead position, a media content playout rate, and a network connection status of the first media player.

21. A method for use by a first media player for synchronizing playout of a first media content with playout of a second media content by a second media player, the first media content and the second media content being a same media content, the method comprising:
    starting to play the first media content;
    transmitting a first state message to a coordinating device while the first media player is playing the first media content, the first state message including a playhead position, a media content playout rate, and a network connection status of the first media player;
    in response to transmitting the first state message to the coordinating device, receiving a first content coordination message from the coordinating device, the first content coordination message including a coordination state for playout of the first media content by the first media player, the coordination state being based on the first state message;
    synchronizing, by the first media player using the first content coordination message, playout of the first media content with playout of the second media content by the second media player; and
    continuing to playout the first media content during and after the synchronizing.

22. The method of claim 21, wherein the first state message includes user activity data corresponding to an action by a user of the first media player.

23. The method of claim 21, wherein the first content coordination message causes the first media player to change a playout rate of the first media content.

24. The method of claim 21, wherein the first content coordination message causes the first media player to change a position of a playhead of the first media player with respect to one of a timecode and a frame number of the first media content.

25. The method of claim 21, wherein the method further comprises:
    determining a first latency estimate for communications with the coordinating device; and
    transmitting the first latency estimate to the coordinating device as part of the first state message.

26. The method of claim 25, wherein the first latency estimate is determined based on a weighted rolling average of a plurality of test latency values measured by the first media player.

27. The method of claim 26, wherein a weight applied to each of the plurality of test latency values is based on how recently each test latency value was measured.

28. The method of claim 26, wherein a weight applied to each of the plurality of test latency values is based on a deviation of each of the test latency values from a standard average of the plurality of test latency values.

29. The method of claim 21, wherein transmitting the first state message, receiving the second state message, receiving the first content coordination message, and synchronizing are all repeated periodically.

30. The method of claim 21, wherein the method further comprises:
    receiving a first latency estimate from the coordinating device.

* * * * *